United States Patent [19]
Halder

[11] Patent Number: 5,303,908
[45] Date of Patent: Apr. 19, 1994

[54] DEVICE FOR RELEASABLY SECURING TWO OBJECTS TOGETHER

[75] Inventor: Werner Halder, Achstetten 3/Bronnen, Fed. Rep. of Germany

[73] Assignee: Erwin Halder KG, Achstetten-Bronnen, Fed. Rep. of Germany

[21] Appl. No.: 42,244

[22] Filed: Apr. 2, 1993

[30] Foreign Application Priority Data

Apr. 3, 1992 [DE] Fed. Rep. of Germany ... 9204570[U]

[51] Int. Cl.⁵ .............................................. B23Q 3/02
[52] U.S. Cl. ..................................... 269/48.1; 269/49
[58] Field of Search ............... 279/2.23, 141, 2.12; 269/309, 48.1, 49

[56] References Cited

U.S. PATENT DOCUMENTS

| | | | |
|---|---|---|---|
| 1,864,466 | 6/1932 | Peterson | 279/2.23 |
| 4,322,190 | 3/1982 | Anderson | 279/2.23 |
| 4,350,463 | 9/1982 | Friedline | 279/2.23 |
| 4,932,642 | 6/1990 | Salenbien et al. | 269/309 |
| 4,958,839 | 9/1990 | Guzik et al. | 279/2.23 |
| 5,190,272 | 3/1993 | Zika et al. | 269/309 |

OTHER PUBLICATIONS

Carr Lane Manufacturing Co., "Adjustable Ball Lock Pins", (rev. Feb. 1991) 1 page.

*Primary Examiner*—Robert C. Watson
*Attorney, Agent, or Firm*—Herbert Dubno; Andrew Wilford

[57] ABSTRACT

A device for clamping a workpiece formed with a throughgoing hole and having a pair of faces to a support also formed with a throughgoing hole and also having a pair of faces has a tube engaged along an axis through both the holes in a position of the workpiece and support with one face of the workpiece bearing inwardly on one face of the support, the holes aligned, and the other faces of the workpiece and support turned outwardly away from each other. The tube is formed with a radially throughgoing aperture opening outwardly of one of the outer faces and with a screwthread outward of the other outer face. A retaining element is radially displaceable in the aperture between an extended position projecting radially from the tube and engageable axially with the one outer face and a retracted position generally wholly recessed in the tube. An actuating pin axially displaceable in the tube is engageable with the element to radially displace same into its extended position. A nut threaded on the screwthread of the tube has a face bearing axially inward on the other outer face. A formation on the one outer face angularly engages with the element in the extended position immediately adjacent the hole of the support of the element for preventing rotation of the tube in the holes.

13 Claims, 2 Drawing Sheets

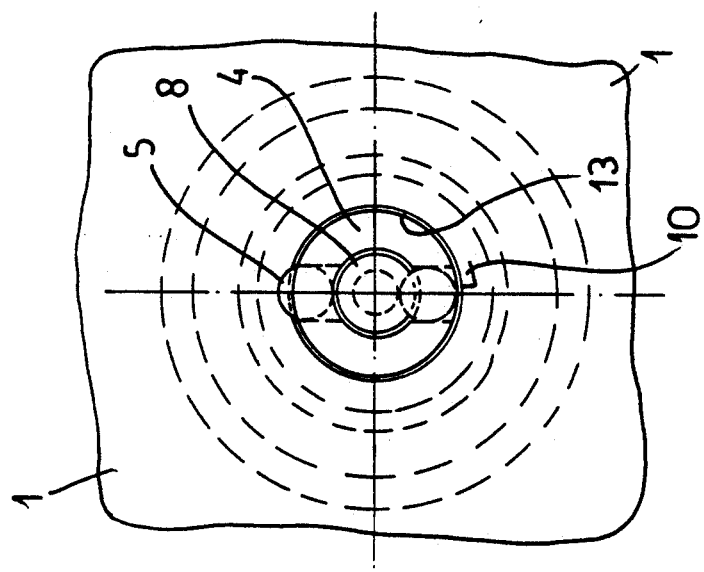
FIG.2
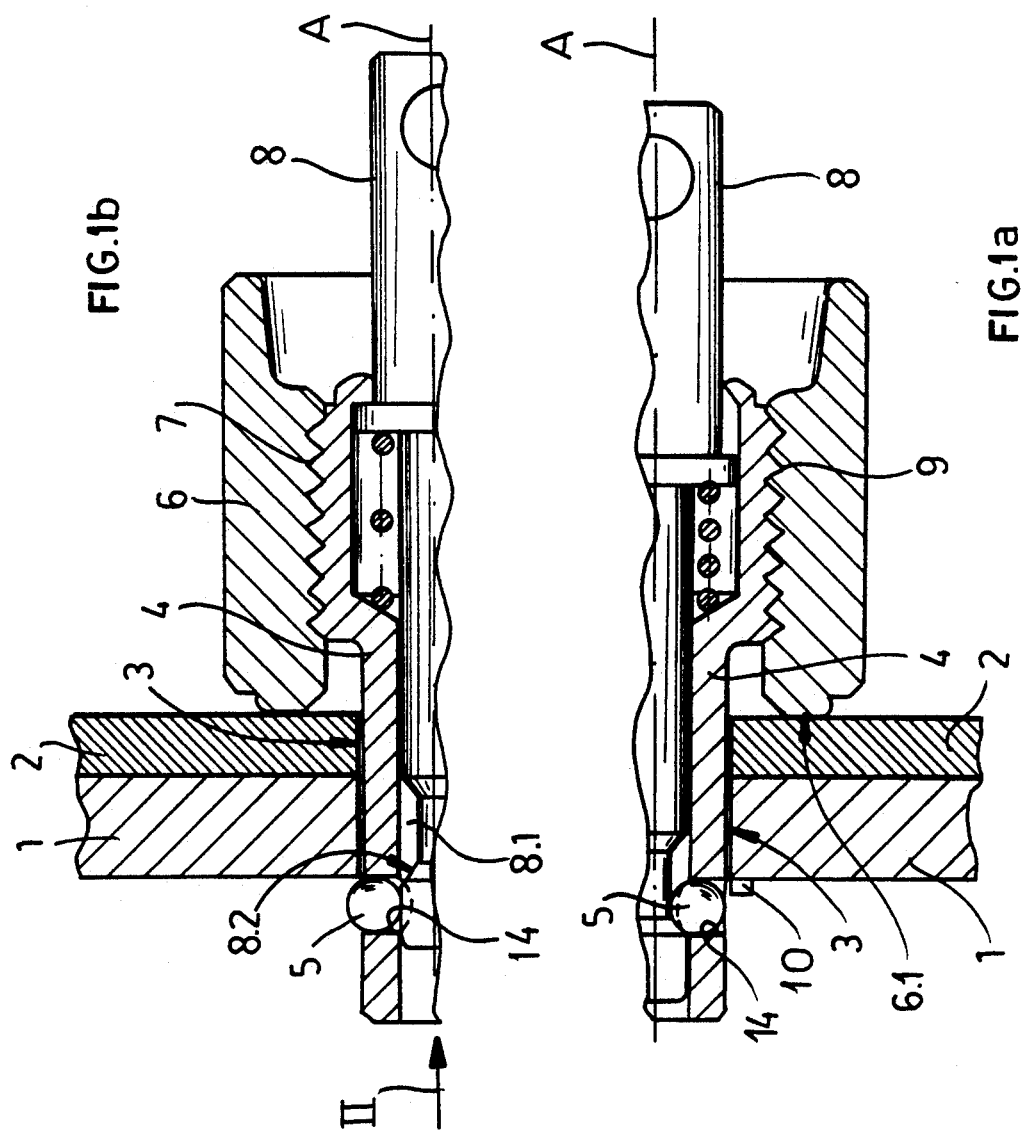
FIG.1b
FIG.1a

DEVICE FOR RELEASABLY SECURING TWO OBJECTS TOGETHER

FIELD OF THE INVENTION

The present invention relates to a device for releasably securing two parts or objects together. More particularly this invention concerns such a device used to secure a workpiece to a jig, support table, or the like and known in the trade as a ball lock pin.

BACKGROUND OF THE INVENTION

In order to secure a workpiece to a support so as to be able to work on the workpiece or handle it more easily, a device is known which fits through two similarly dimensioned holes in the two objects, the workpiece and the support, to clamp them solidly together in a position with one face of one of the objects bearing solidly against one face of the other object and the other faces of the objects turned outwardly away from each other. This device, called a ball lock pin and sold, for example, by Carr Lane Manufacturing Co. typically comprises a tube engaged along an axis through both the aligned holes and formed with at least one radially throughgoing aperture opening outwardly of one of the outer faces and with a screwthread outward of the other outer face. A retaining element typically formed as a ball is radially displaceable in the aperture between an extended position projecting radially from the tube and engageable axially with the one outer face and a retracted position generally wholly recessed in the tube. An actuating pin axially displaceable in the tube can engage with the element to radially displace same into its extended position.

In order to insure good axially directed clamping, a nut threaded on the screwthread of the tube has a face bearing axially inward on the other outer face. Thus the tube is pushed through the aligned holes in the workpiece and support (which can be another workpiece) and the pin is actuated to extend the element. Then the nut is screwed down to secure the two objects between the element and the nut face.

The last-stage clamping is fairly difficult in that the user must normally exert considerable traction on the tube to engage the element forcibly against the outer face of the opposite side so that when the nut is turned the entire device does not rotate. When the element is a ball this rotation is a particular problem that makes it fairly difficult to get the clamp tight.

OBJECTS OF THE INVENTION

It is therefore an object of the present invention to provide an improved clamp device of the above-described type.

Another object is the provision of such an improved clamp device of the above-described type which overcomes the above-given disadvantages, that is which is relatively easy to screw very tightly to the two objects.

SUMMARY OF THE INVENTION

A device for clamping a workpiece formed with a throughgoing hole and having a pair of faces to a support also formed with a throughgoing hole and also having a pair of faces has according to the invention a tube engaged along an axis through both the holes in a position of the workpiece and support with one face of the workpiece bearing inwardly on one face of the support, the holes aligned, and the other faces of the workpiece and support turned outwardly away from each other. The tube is formed with a radially throughgoing aperture opening outwardly of one of the outer faces and with a screwthread outward of the other outer face. A retaining element is radially displaceable in the aperture between an extended position projecting radially from the tube and engageable axially with the one outer face and a retracted position generally wholly recessed in the tube. An actuating pin axially displaceable in the tube is engageable with the element to radially displace same into its extended position. A nut threaded on the screwthread of the tube has a face bearing axially inward on the other outer face. A formation on the one outer face angularly engages with the element in the extended position immediately adjacent the hole of the support of the element for preventing rotation of the tube in the holes.

Thus with this system the formation prevents rotation of the tube when it angularly engages the element, which normally is a ball, and thereby allows the nut to be turned to tighten the clamp.

According to the invention the formation projects axially from the one outer face and in fact is unitarily formed with the support as a spur.

Furthermore according to the instant invention the one outer face is recessed around the respective hole. More particularly the hole opening at the one outer face is provided with a tubular liner formed with the formation. This liner is externally threaded and is threaded into the respective hole. In fact the liner is externally threaded along its entire axial length and has an end directed axially away from the one outer face and formed with a blade-receiving slot. The formation can be an axially open recess in an end of the liner, or the tube can be formed with a plurality of such orifices each holding a respective such element and the liner can be formed with a complementary array of such formations positioned to simultaneously receive all of the elements. Alternately the tube can be formed with two such orifices diametrally opposite each other and each holding a respective such element and the liner with a pair of such formations diametrally opposite each other. It is also possible for the tube to have two such orifices diametrally opposite each other and each holding a respective such element and the liner to have a pair of such formations offset by about 90° to each other relative to the axis. In a further arrangement the liner is of T-shape and has an enlarged head forming the one outer face and formed with the formation.

BRIEF DESCRIPTION OF THE DRAWING

The above and other objects, features, and advantages will become more readily apparent from the following, reference being made to the accompanying drawing in which:

FIGS. 1a and 1b ar partial axial sections through the clamping device of this invention in the unactuated and actuated positions, respectively;

FIG. 2 is an end view of the clamping device taken in the direction of arrow II of FIG. 1a;

FIG. 3b is an axial section through a support provided with the arrangement of FIG. 3a;

FIG. 4b is an axial section through the support insert of FIG. 4a.

SPECIFIC DESCRIPTION

Figure 3B:
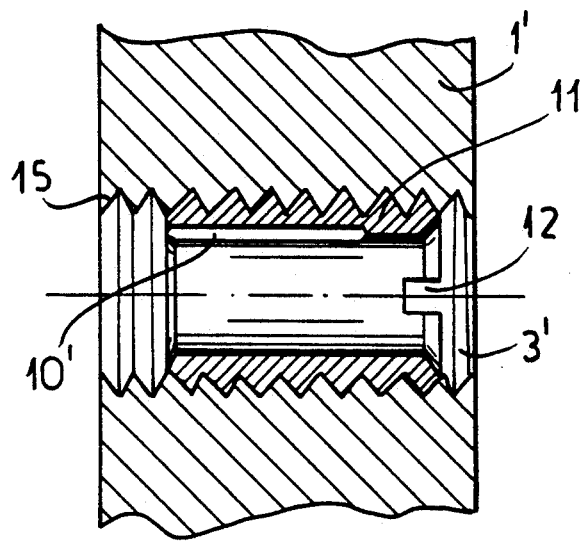

As seen in FIGS. 1a, 1b, and 2, a ball lock pin according to this invention is used to hold together two objects 1 and 2, here a support 1 and a workpiece 2, formed with identical throughgoing cylindrical bores 3. The support 1 can be a table or jig to which the workpiece 2 is secured or can be another workpiece for gang-cutting or otherwise working on the two at the same time.

The device has a tubular body 4 centered on an axis A and having one end formed with two radially oppositely throughgoing apertures 14 and at its opposite end with an enlargement in turned formed with a screwthread 7. Each aperture 14 receives a respective entrainment element, here a ball 5 and is of slightly restricted cross section at its outer end to prevent the respective ball 5 from falling out. A retaining pin 8 is axially displaceable inside the tube 4 and has a radially outwardly open groove 8.1 formed with an angled flank 8.2 that can press the balls 5 from the radially inner position of FIG. 1a to the radially outer position of FIG. 1b. FIG. 2 shows the upper ball 5 in the extended position and the lower ball 5 in the retracted position. A spring 9 urges the pin 8 axially so as to urge the balls 5 outward. In addition a nut 6 threaded over the tube 4 has a face 6.1 that engages the outer face of the workpiece 2.

This system is used by first placing the faces of the two objects 1 and 2 together, and then inserting the tube 4 through the aligned holes with the pin 8 retracted so that the balls 5 are not extended. Once the tube 4 is pushed through enough that the balls 5 have passed the opposite face of the support 1, the pin 8 is allowed to rise axially back out under the force of the spring 9 to push out the balls 5 so that they can axially engage the outer face of the support 1. Then the nut 6 is screwed down to press its face 6.1 against the outer face of the workpiece 1 and thereby squeeze the workpiece 1 and support 2 between the face 6.1 and the elements 5.

According to the invention the outer face of the support 1 is formed with a bump 10 constituted as an integral spur that is immediately adjacent the hole 3. Thus when the nut 6 is rotated and the tube 4 is simultaneously entrained rotationally, one of the balls 5 engage the formation 10 and prevents further rotation, thereby permitting the nut 6 to be tightened.

Figure 3A:
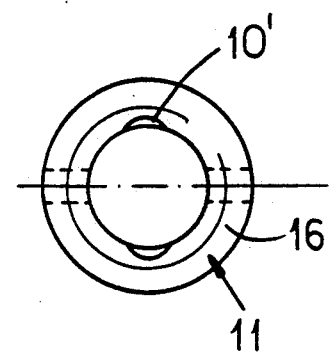
FIG. 3a is an end view of an insert forming a part of an alternative arrangement of this invention.

In the arrangement of FIGS. 3a and 3b a support 1' is formed with a bore 3' having an internal screwthread 15 meshing with a full-length external screwthread 16 of a liner tube 11. One end of this liner 11, which forms the outer face of the support 1' immediately around the hole 3', is formed with a pair of diametrally opposite cutouts or notches 10' constituting ball-catching formations. Thus the two balls 5 will drop into these notches or seats 10' and thereby prevent the tube 4 from rotating when the nut 6 is turned.

Figure 4A:
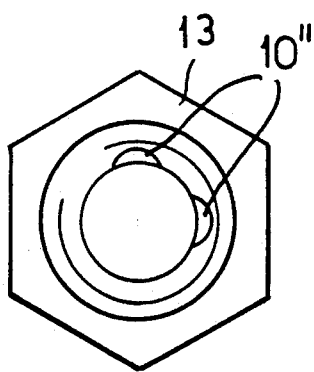
FIG. 4a is an axial end view of another support insert according to the invention.
Figure 4B:
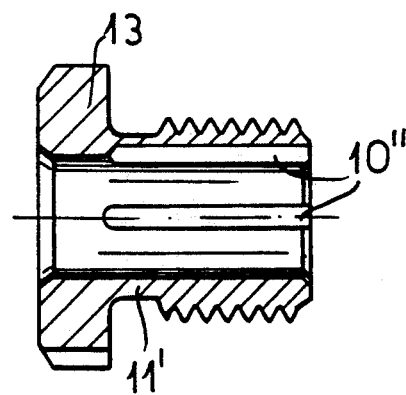

Similarly in FIGS. 4a and 4b a T-shaped liner 11' is formed with two 90° offset axially extending grooves 10" that can receive balls 5 to prevent rotation of the tube 4. This liner 11' has a head 13 that lies against a face of the support 1.

I claim:

1. A device for clamping a workpiece formed with a throughgoing hole and having oppositely directed inner and outer faces to a support also formed with a throughgoing hole and also having oppositely directed inner and outer faces, the device comprising:

a tube engaged along an axis through both the holes in a position of the workpiece and support with the inner face of the workpiece bearing inwardly on the inner face of the support, the holes aligned, and the outer faces of the workpiece and support turned outwardly away from each other, the tube being formed with a radially throughgoing aperture opening outwardly of one of the outer faces and with a screwthread outward of the other outer face;

a retaining element radially displaceable in the aperture between an extended position projecting radially from the tube and engageable axially with the one outer face and a retracted position generally wholly recessed in the tube;

an actuating pin axially displaceable in the tube and engageable with the element to radially displace same into its extended position;

a nut threaded on the screwthread of the tube and having a face bearing axially inward on the other of the outer faces; and a formation on the one outer face angularly engageable with the element in the extended position of the element immediately adjacent the hole of the support for preventing rotation of the tube in the holes.

2. The clamping device defined in claim 1 wherein the formation projects axially from the one outer face.

3. The clamping device defined in claim 2 wherein the formation is unitarily formed with the support.

4. The clamping device defined in claim 3 wherein the projection is formed as a spur.

5. The clamping device defined in claim 1 wherein the one outer face is recessed around the respective hole.

6. The clamping device defined in claim 5 wherein the support includes a tubular liner formed with the formation and forming the hole of the support and the outer face of the support immediately adjacent the hole of the support.

7. The clamping device defined in claim 6 wherein the liner is externally threaded and is threaded into the respective hole.

8. The clamping device defined in claim 7 wherein the liner is externally threaded along its entire axial length and has an end directed axially away from the one outer face and formed with a blade-receiving slot.

9. The clamping device defined in claim 7 wherein the formation is an axially open recess in an end of the liner.

10. The clamping device defined in claim 7 wherein the tube is formed with a plurality of such orifices each holding a respective such element, the liner being formed with a complementary array of such formations positioned to simultaneously receive all of the elements.

11. The clamping device defined in claim 7 wherein the tube is formed with two such orifices diametrally opposite each other and each holding a respective such element, the liner being formed with a pair of such formations diametrally opposite each other.

12. The clamping device defined in claim 7 wherein the tube is formed with two such orifices diametrally opposite each other and each holding a respective such element, the liner being formed with a pair of such formations offset by about 90° to each other relative to the axis.

13. The clamping device defined in claim wherein the liner is of T-shape and has an enlarged head forming the one outer face and formed with the formation.

* * * * *